US007002701B1

(12) United States Patent
Nakayasu et al.

(10) Patent No.: US 7,002,701 B1
(45) Date of Patent: Feb. 21, 2006

(54) IMAGE FORMATION APPARATUS AND IMAGE EXPOSURE APPARATUS

(75) Inventors: Hirofumi Nakayasu, Kawasaki (JP); Youji Houki, Kawasaki (JP); Yoshihiko Taira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/464,449

(22) Filed: Dec. 16, 1999

(30) Foreign Application Priority Data

Dec. 18, 1998 (JP) ................................ 10-361681

(51) Int. Cl.
*G06F 15/00* (2006.01)

(52) U.S. Cl. ....................... 358/1.12; 358/1.2; 358/1.8; 358/1.9

(58) Field of Classification Search ............... 358/1.12, 358/1.13, 1.14, 1.15, 1.16, 1.17, 1.2, 1.8, 358/1.9; 382/162, 167
See application file for complete search history.

(56) References Cited

U.S. PATENT DOCUMENTS

| | | | | |
|---|---|---|---|---|
| 4,916,547 A | | 4/1990 | Katsumata et al. | 358/300 |
| 5,838,001 A | * | 11/1998 | Minakuchi et al. | 250/236 |
| 6,345,116 B1 | * | 2/2002 | Kojima et al. | 382/167 |

FOREIGN PATENT DOCUMENTS

| | | |
|---|---|---|
| JP | 63-292163 | 11/1988 |
| JP | 6-261177 | 9/1994 |
| JP | 09-090697 | 4/1997 |
| JP | 9-109448 | 4/1997 |
| JP | 9-326902 | 12/1997 |

* cited by examiner

*Primary Examiner*—Mark Wallerson
(74) *Attorney, Agent, or Firm*—Armstrong, Kratz, Quintos, Hanson & Brooks, LLP

(57) ABSTRACT

There is provided a new image formation apparatus which does not generate a positional gap or discrepancy of a transferred image even when a final product is dependent upon a manufacturing accuracy in the exposure portion, particularly at the time of formation of the color image. Further, the present invention provides a new image exposure apparatus such as an LED head, an EL head, an LD scan unit, etc. which are used for the image formation apparatus. The image formation apparatus comprises an image storage device for storing image information, a read-out device for assigning an image information read-out position of an image storage device to read out the image information, an image transfer unit for transferring an image onto a paper in accordance with the image information read out by the read-out device from the image storage device, and an accuracy information storage device for storing position accuracy information in a scanning direction of the image transfer unit. The read-out device has a device for reading out the position accuracy information from the accuracy information storage device and correcting the image information read-out position by the position accuracy information.

9 Claims, 13 Drawing Sheets

Fig. 10

FOR C (CYANOGEN)

FOR M (MAGENTA)

FOR Y (YELLOW)

CORRECTION TABLE FOR CYANOGEN

| PIXEL ADDRESS IN MAIN SCAN DIRECTION | Y-DIRECTION CURVATURE CORRECTION TABLE | OBLIQUE DIRECTION CORRECTION TABLE | CORRECTION TABLE OF CURVATURE + OBLIQUE DIRECTION |
|---|---|---|---|
| 0000 | 0 | 0 | 0 |
| 0001 | 0 | 0 | 0 |
| 2 | -1 | 0 | -1 |
| 3 | 0 | . | 0 |
| 4 | 0 | . | 0 |
| 5 | -1 | . | -1 |
| 6 | 0 | . | 0 |
| 7 | 0 | . | 0 |
| 8 | -2 | . | -2 |
| 9 | 0 | . | 0 |
| . | . | . | . |
| . | . | . | . |
| 960 | +3 | 0 | +3 |
| . | . | . | . |
| . | . | . | . |
| 1920 | +5 | +1 | +6 |
| . | . | . | . |
| . | . | . | . |
| 2780 | +8 | +1 | +9 |
| . | . | . | . |
| . | . | . | . |
| 3840 | +10 | +2 | +12 |
| . | . | . | . |
| . | . | . | . |
| 4800 | +9 | +2 | +11 |
| . | . | . | . |
| . | . | . | . |
| 5760 | +6 | +3 | +9 |
| . | . | . | . |
| . | . | . | . |
| 6720 | +4 | +3 | +7 |
| . | . | . | . |
| . | . | . | . |
| 7679 | +2 | +4 | +6 |

OBTAINED FROM $\theta = \Delta Y/L$

IMAGE FORMATION APPARATUS AND IMAGE EXPOSURE APPARATUS

BACKGROUND OF THE INVENTION

The present invention relates in general to an image (picture) formation apparatus which permits improvement in defects of misregistration (gap or discrepancy) of transferred image or picture and, more particularly, to an image formation apparatus which produces no color misregistration when developed images per basic color of a plurality of colors are brought into registration and an image exposure apparatus, such as LED heads, EL heads and LD scanner unit which are applied to the image formation apparatus.

In the electronic photographic color printers, there are two main streams of system: one is tandem system in which image transfer units for a basic color of plurality of colors constituting a color image are aligned and the other is one-drum system using a single exposure device and a single large-diameter drum.

In the tandem system, each image transfer unit has, in general, an exposure portion constituted by LED and so forth for providing exposure according to read-out image information, a transfer portion constituted by a photosensitive drum for transferring an image, which was formed as a transferring image, onto a paper by the exposure. The image transfer units thus formed are aligned in a feeding direction of the paper for the basic color components, such as yellow Y, magenta M, cyanogen C, black K, and images per the basic color are transferred in turn to the paper on the feeding belt.

In the image transfer unit described above, toners for each of the basic colors for image transfer are used for the image transfer are used up, the toners can be changed for new ones by a unit. However, if an installation accuracy of each of the image transfer units is not good enough, the position accuracy is different from each other with respect to each of the devices and this requires adjustment. Further, exchange of the units sometimes results in deficiency in accuracy of position of the image transfer units which results in misregistration between the transferred images of the colors, and further, in color misregistration in the final products.

In order to solve the problems described above, an attempt has been made to provide detection sequence means for detecting an extent or degree of misregistration with respect to the positions of main scanning direction (that is, a longitudinal direction of the exposure portion), sub-scanning direction (that is, paper feeding direction that is perpendicular to the main scanning direction) and oblique direction (that is, overlapping relation between the main scanning direction and the sub-scanning direction), so that misregistration is detected at the opposing two points in a widthwise direction of the paper and then correction is made prior to the initiation of the printing process.

However, if there is some reasons for deficiency in accuracy such as warps or curvature in the scanning direction with respect to each unit of the image transfer units, the conventional method of misregistration detection is unable to proceed successful correction of the misregistration. Particularly, when there is a curvature or warp in the scanning direction in the exposure portion and when there is some deficiency in dot-pitch accuracy, it is impossible to correct the misregistration by the conventional technique as described above and, therefore, there is a serious problem that the products are inevitably dependent upon a manufacturing accuracy of the exposure portion.

SUMMARY OF THE INVENTION

In view of the foregoing, an object of the present invention is to provide an improvement in an image formation apparatus does not provide a positional misregistration (that is, gap or discrepancy) of a transferred image even when a final product is depended upon a manufacturing accuracy in the exposure portion, particularly at the time of formation of the color image.

Further, another object of the present invention is to provide a new image exposure apparatus such as an LED head, an EL head, an LD scan unit, etc. which are used for the image formation apparatus as described above.

According to the present invention, there is provided an image formation apparatus comprising an image storage means for storing image information; a read-out means for assigning an image information read-out position of the image storage means to read out the image information; an image transfer unit for transferring an image onto a paper in accordance with the image information read out by the read-out means from the image storage means: and an accuracy information storage means for storing position accuracy information in a scanning direction of the image transfer unit, wherein the read-out means has a means for reading out the position accuracy information from the accuracy information storage means and correcting the image information read-out position by the position accuracy information.

In the structure described above, it is possible that position accuracy information in the scanning direction of the image transfer unit, or otherwise position accuracy information in the scanning direction of the image transfer unit which was detected prior to the image transfer, is stored in the accuracy information storage means. Thus, at the time of image transfer, the read-out means serves to read out the position accuracy information from the accuracy information storage means, and the image information read-out position is corrected in accordance with the position accuracy information. According to the thus corrected image information read-out position, the read-out means serves to read out the image information from the image storage means. Therefore, even in the case that there is a defect that each image transfer unit depends upon manufacturing accuracy, a correction is made possible and it is possible to produce no misregistration of transferred images and/or no color misregistration.

As described above, the present invention aims to solve the problems of the defects of dependency upon the manufacturing accuracy of each image transfer unit. Accordingly, examples of position accuracy information described above will be, for example, curvature correction information which is obtained from the position curvature information in the scanning direction of the image transfer unit (as defined in claim 2) or dot-pitch correction information obtained from the dot position information in the main scanning direction of the image transfer unit (as defined in claim 3), which are caused by, or originated from, the defects or disadvantages of dependency upon manufacturing accuracy of the image transfer unit. The present invention, however, is not limited to those correction information, but can be extended to the combination between the position accuracy information caused by the detects of dependency upon the manufacturing accuracy of each image transfer unit described above and correction information (in other words, oblique correction information or skew correction information) obtained from information as to misregistration in the oblique direction of the image transfer unit. For example, a combination can be imagined between the curvature correction information and/or dot-pitch correction information and the oblique correction information of the image transfer unit (as defined in claim 7).

The curvature correction information and the dot-pitch correction information are generally detected at the manufacturing stage, except for the case that users detect, posteriori, the position curvature information and the dot-pitch detect information to store the information to the accuracy information storage means, and then stored in the accuracy information storage means. In other words, as illustrated in FIG. 4, a position accuracy information incorporation device 62 such as CCD camera is scanned in a longitudinal direction of an exposure portion of the LED head 34 and, from the incorporated results, the position curvature information and the dot-pitch defect information are detected, so that the correction information (that is, the curvature correction information and dot-pitch correction information) is stored in the accuracy information means.

Further, based upon the fact that the main object of the present invention is to solve the problem of defects of dependency upon the manufacturing accuracy of the image transfer unit, the present invention provided a structure in which the position accuracy information is stored in the accuracy information storage means by each image transfer unit (as defined in claims 4 and 8).

For the similar reasons as described above, correction of the image information read-out position by the read-out means is conducted by each image transfer unit (as defined in claim 5). As position accuracy information, in case that the curvature correction information and/or dot-pitch correction information and the oblique correction information, the correction of the image information read-out position per image transfer unit is conducted by computation or arithmetic means based upon the curvature correction information and/or dot-pitch correction information and the oblique correction information.

Further, the position accuracy information is used for correcting the deficiencies caused by the dependency upon the manufacturing accuracy of each image transfer unit and, accordingly, the accuracy-information storage means which stores therein the position accuracy information is mounted in the image transfer unit (as defined in claim 6), and each unit has the information so that the problems of the image transfer misregistration and color misregistration can be avoided even if the image transfer unit is changed with another one. In case that the curvature correction information and/or dot-pitch correction information and the oblique correction information are of coexistence or are mutually included as position accuracy information, it will be good enough only if the accuracy information storage means in which at least the curvature correction information and/or dot-pitch correction information is (are) stored is mounted on the interior of the image transfer unit (as defined in claim 10).

In this case, a memory device such as EEPROM which stores the curvature correction information and/or dot-pitch correction information is incorporated, as a part of the accuracy information storage means, in each of the image transfer units and, by the read-out means, the curvature correction information and/or dot-pitch correction information is read out by the read-out means such as the EEPROM together with the oblique correction information is read out from the accuracy information storage means. The memory device is not limited to EEPROM but it would be desirable that it is of the type which can store the information when no power source is supplied. In this case, the memory device is preferably of the type which is capable of write-in and correction so that it is convenient to detect and store in a posteriori manner, the curvature correction information and dot-pitch correction information.

In another feature of the invention (as defined in claim 11), a transmission line for the curvature correction information and/or dot-pitch correction information is defined and, more particularly, the curvature correction information and/or dot-pitch correction information in the position accuracy information is or are transmitted through the same transmission line as that of the read-out of the image information from the image storage means to be read out by the read-out means.

In the explanation of the embodiment of the invention which will be made presently, main portions, such as SRAM etc. for an accuracy information storage means which stores oblique correction information based upon oblique information detected before the start of printing is provided on the side of an engine controller of a printer, and apart form the above, a memory device such as EEPROM which stores each curvature correction information and/or dot-pitch correction information is disposed, as a part of the accuracy information storage means, on each of the image transfer unit sides. The accuracy information storage means on the engine controller side is assigned to be a "master" whereas the accuracy information storage means on the side of the image transfer unit side is a "slave", and in accordance with requirement of the master, the curvature correction information and/or dot-pitch correction information stored on the slave side is transmitted to the accuracy information storage means of the master side through the transmission line, computation is conducted based upon the curvature correction information and/or dot-pitch correction information and the oblique correction information by the read-out means which has read out these information, and then correction of the image information read-out position (that is, conversion of address assignment which will be described presently) for each image transfer unit is conducted. If such a transmission line is used to proceed read-out, it is not required to provide a separate and additional interface device for reading out the data and, therefore, it is not required to increase in production step, number of production parts and production cost.

In the feature of the present invention (as defined in claim 12), the curvature correction information and/or dot-pitch correction information in the position accuracy information is transmitted by using the same transmission line as used in reading out the image information from the image storage means and then stored in the accuracy information storage means. In this structure, the accuracy information storage means which stores therein the curvature correction information is mounted in the image transfer unit and, in addition, the positional curvature information and/or dot-pitch defect information is or are not detected previously on the manufacturing stage but, on the other hand, correction information as to these defective information is stored in the accuracy information storage means mounted on each of the image transfer units, when the users use the image formation apparatus of the present invention and find or detect the positional curvature information and/or dot pitch defecting information described above.

In other words, on the side of the image transfer unit, there is provided a part of the accuracy information storage means comprised of EEPROM for storing the curvature correction information and/or dot-pitch correction information and the information is not stored at the stage of production. Thereafter, the users or repairing personnel detect the position curvature information and/or dot-pitch detect information by a predetermined method and, in case that the corresponding correction information is stored in the accuracy information storage means mounted on the image transfer units, it is not required to provide additional interface devices for solely storing them if the transmission line described above is used for processing the storage. Thus, it is not required to increase in production steps, production parts and production cost. Incidentally, if the accuracy information storage means is constructed with EEPROM and the like which stores the curvature correction information and/or dot-pitch correction information, it is necessary to provide a structure which can supply a predetermined electric voltage to the image transfer unit in the write-in device of the information.

The detection posteriori of the position curvature information, which is different from the case of detection at the production step, can be made apparent by, for example, transferring different basic colors (black K and cyanogen C) are located in an overlapping relation and transferred to a paper, and detecting the portions of difference in color brightness from the transferred image such as overlapped lines and so forth and, by means of Fourier transform, obtaining a curvature condition of the exposed portion. It is apparent that this method can be conducted in the production step and the corresponding correction information is previously stored in the accuracy information storage means.

Besides the above, the place where the accuracy information storage means for storing therein the curvature correction information and/or dot-pitch correction information is mounted is not limited to the interior of the aforementioned image transfer unit but it can be mounted on a control board which serves to control mechanically the entire device of the image formation apparatus of the invention.

Further, the present invention provides an exposure portion in the image transfer unit so that the above-described position accuracy information is stored in an exposure portion. Namely, in another feature of the invention (as defined in claim 13), the position accuracy information is stored in the inner accuracy information device. In that case, the position accuracy information stored in the accuracy information storage means may be curvature correction information obtained from the position curvature information in the scanning direction of the image exposure device (as defined in claim 14) and, in other case, dot-pitch correction information obtained from the dot position information in the main scanning direction of the image exposure device (as defined in claim 15).

BRIEF DESCRIPTION OF THE DRAWINGS

FIG. 10 is an explanatory diagram showing a state of a stored correction table of each kind of correction profiles per pixel.

DESCRIPTION OF THE PREFERRED EMBODIMENT

Preferred embodiments of the invention will be described with reference to figures of the accompanying drawings.

(First Embodiment of the Invention)

Figure 1:
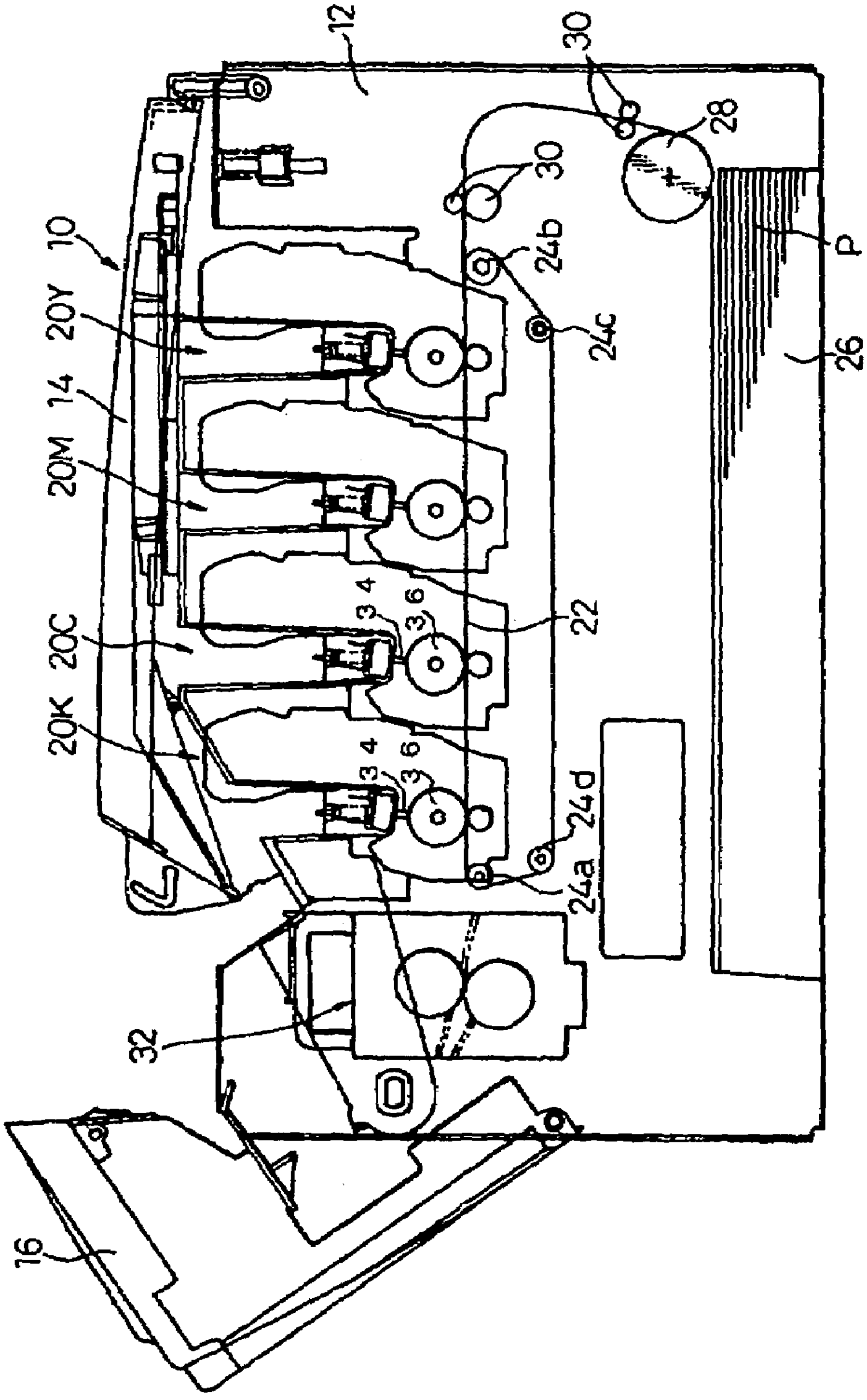
FIG. 1 is a sectional view of an image formation apparatus embodying the present invention.

In FIG. 1 which shows in cross section an image formation apparatus according to a first embodiment of the invention, the image formation apparatus 10 has four printing assemblies 20Y, 20M, 20C, 20K arranged in series. An endless delivery belt 22 is provided for the four printing assemblies described above. The delivery belt 22 is made of a suitable transparent synthetic resin and wound around the four rollers 24*a*. 24*b*, 24*c*. 24*d*. The roller 24*a* is a driving roller and also serves, as an AC exclusion (discharge) roller, to exclude an electric charge from the delivery belt 22. The roller 24*b* is a follower roller and also serves, as a charge roller, to provide an electric charge to the delivery belt 22. The remaining rollers 24*c*, 24*d* are guide rollers and the guide roller 24*d* serves as a tension roller for providing a suitable tension to the delivery belt 22.

A hopper 26 is provided below the delivery belt 22. A bundle of paper P is stored in the hopper 26. Paper P is delivered one by one from the hopper 26 to a pick roller 28 and then delivered to the deliver belt 22 by a paper feeding roller 30. The paper P is fed through the delivery belt 22 to the print assemblies 20Y, 20M, 20C, 20K and printed or recorded. The recorded paper is then fed to a fixer 32 and then discharged to a stacker, which is formed on an upper surface of a top cover 14, through a suitable guide roller (not shown).

Since the delivery belt 22 is charged by the follower roller 24*d*, the paper P, when introduced from the follower roller 24*d* to the delivery belt 22, is electrostatically held, in an adhesive or sucking relation, to the delivery belt 22. The driving roller 24*a*, on the other hand, serves as a discharge roller and therefore an electric charge is excluded when the paper P is passed through the driving roller 24*a*, and the paper P is easily separated from the delivery belt 22. Then the paper P which is separated from the delivery belt 22 is fed toward the fixer 32.

The four print assemblies 20Y, 20M, 20C, 20K have the same structure with each other. The print assembly 20Y contains a developer having yellow toner component, and the print assembly 20M contains a developer having magenta toner component. The print assembly 20C contains a developer having cyanogen toner component. The print assembly 20K contains a developer having a black toner component. Accordingly, these print assemblies 20Y, 20M, 20C, 20K print on a paper P an image of yellow toner, magenta toner, cyanogen toner, and black toner, respectively, and a combined toner image of a full color is formed.

As shown in FIG. 1, a paper P is introduced from the follower roller 24*b* of the delivery belt 22 to a printing portion and passed, in turn, through the print assemblies 20Y, 20M, 20C, 20K so that a four-color toner image is formed on the paper P to produce a full color image. Then, the paper P is fed from the driving roller 24*a* of the delivery belt to a heat-roller type heat fixer 32 where the full color image in fixed on the paper P.

Figure 2:
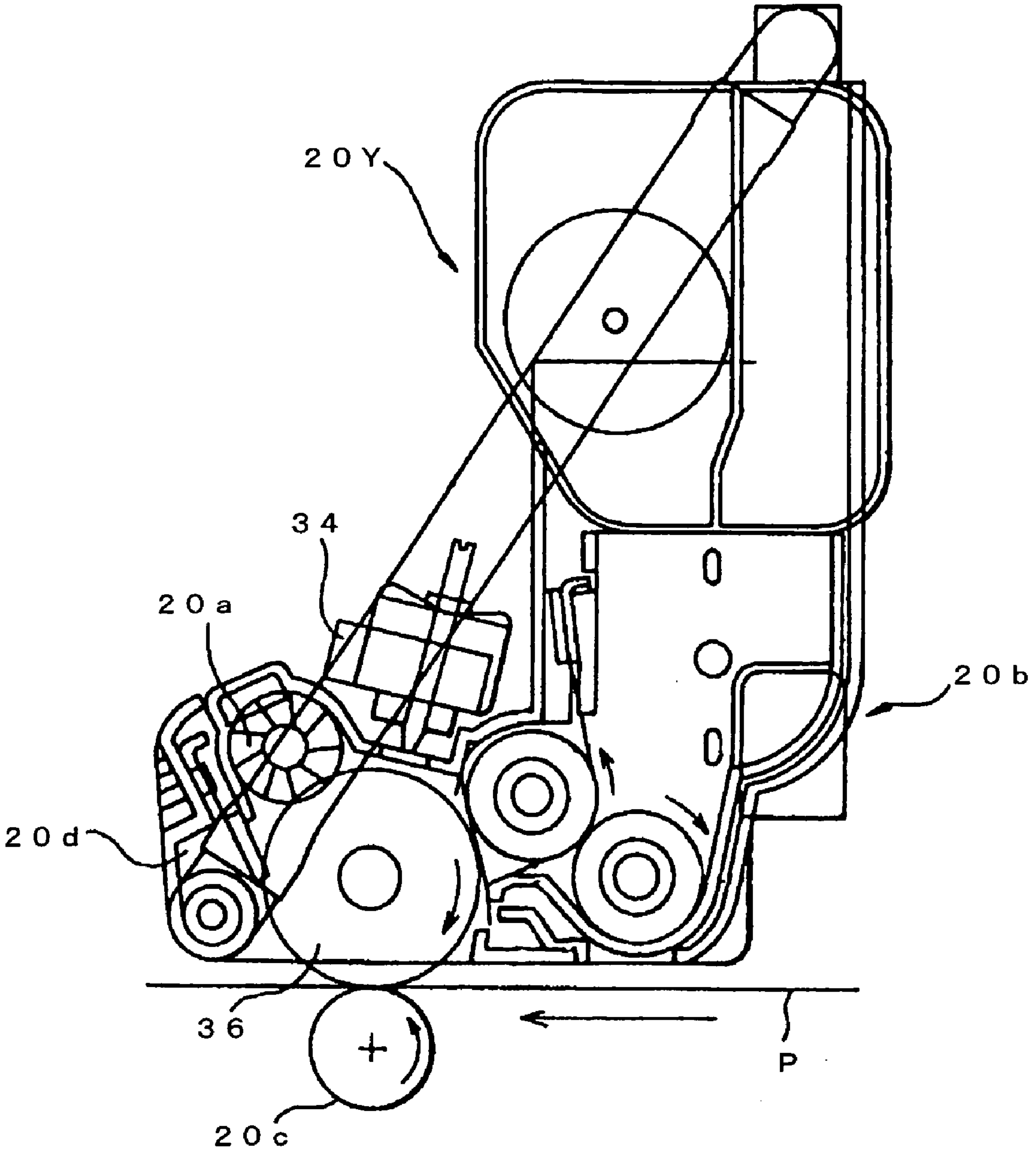
FIG. 2 is a sectional view of an image transfer unit showing the detailed construction thereof.

FIG. 2 shows a structure of the print assembly 20Y which will be solely described in detail and the explanation of the other print assemblies will be omitted for simplification only since the other print assemblies 20M, 20C, 20K is considered to be quite similar with the print assembly 20Y. The print assembly 20Y has a photosensitive 36, which is driven to be rotated in the direction shown by an arrow in FIG. 2. Around the photosensitive drum 36 are provided, in turn, a precharge device 20*a*, an LEAD head 34, a developer 20*b*, a transfer element (transfer roller) 20*c*, and a toner cleaner 20*d*.

In the print assembly 20Y, the entire structure including the LED head 34 and the photosensitive drum 36 as well as the precharge device 20*a*, the developer 20*b*, the transfer element 20*c* and the toner cleaner 20*d* are formed into a single, unitary structure as an image transfer unit, and each image transfer unit 20 is releasably attached to the flame 12.

Figure 3:
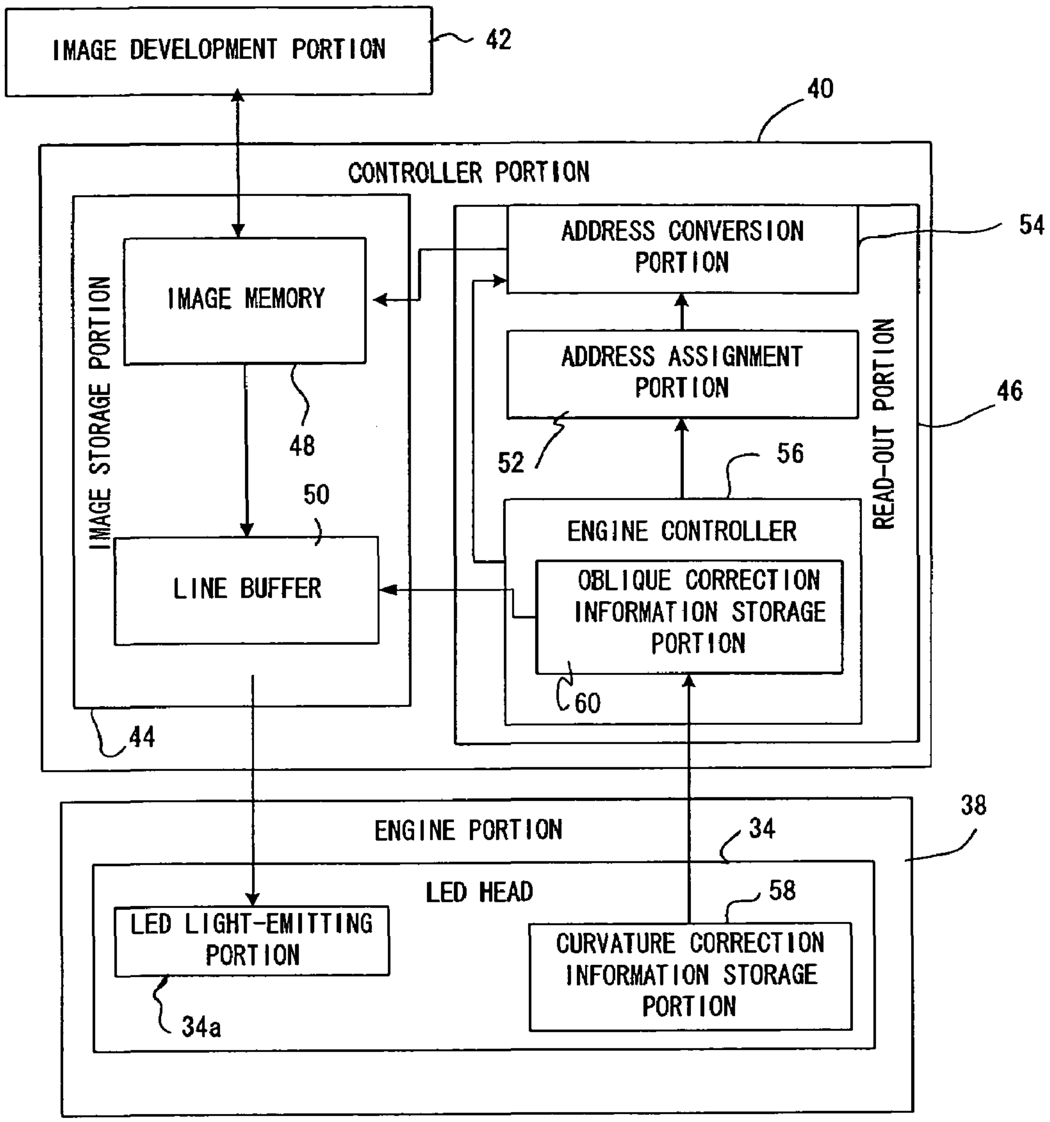
FIG. 3 is a block diagram of a hardware configuration of the image formation apparatus of the invention.

In FIG. 3 which shows a hardware structure of the image formation apparatus, the hardware structure is composed mainly of engine portion 38 and a controller portion 40.

In the engine portion 38, the aforementioned delivery belt 22, and the image transfer unit 20 (that is, the print assemblies 20Y, 20M, 20C, 20K) which is arranged in the feeding direction of the paper P with respect to each of the basic colors of yellow, magenta, cyanogen and black constituting a color image, and serves to transfer images per basic colors on the paper P on the delivery belt 22. In the illustration of FIG. 3, the LED 34 is solely shown which constitutes an exposure portion of the image transfer unit.

In the controller portion 40, there are provided an image development portion 42 for conducting transmission of signals to and from a host computer and development to basic colors forming a color image, an image memory portion 44 which receives image information of each basic color from the image development portion 42 and stores therein, and a read-out portion 46 which reads out image information from the image memory portion 44 and transmits the read-out data to the LED head 34 (LED light emitting portion 34.

The image memory portion 44 has an image memory 48 serving as a screen buffer, and a line buffer 50 which reads out the image information after dividing the same for each line from the image memory and then transmits the divided image to the LED light emitting portion 34*a* of the LED head 34.

The read-out portion 46 has an address assignment portion for assigning an image information read-out address of the image memory 48, an address conversion portion 54 for converting the address assignment of the address assignment portion 52 for the purpose of conducting a curvature correction and oblique correction which will be explained presently, and an engine controller 56 for ordering the address assignment portion 52 with respect to the address assignment and transmitting an output of correction data (that is, data which corresponds a correction value for curvature plus oblique correction which will be described presently) for the purpose of conducting a conversion of the address assignment relative to the address conversion portion 52, and also ordering a transmission of the divided image for each of the predetermined clock to the LED emitting portion 34*a* relative to the aforementioned line buffer 50.

In the construction described above, on the side of the LED head 34, there is provided a curvature correction information storage portion 58 which is composed of EEPROM and so forth for storing the curvature correction information obtained from the position curvature information of the LED light emission portion 34*a*, wherein the position curvature information is detected as per the LED head 34. Further, in the engine controller 56, there is provided an oblique correction information storage portion 60 which is composed of SRAM and so forth for storing the curvature correction information which is read out from the curvature correction information storage portion 58 and the oblique correction information per the image transfer unit 20. The structure described above will be explained in detail. By the curvature correction information storage portion 58 and the oblique correction information storage portion 60, an accuracy information storage portion which stores the position accuracy information of the each image transfer unit 20.

The read-out portion 46, in the engine controller 56, reads out the position accuracy information from these accuracy information storage portions (that is, the curvature correction information storage portion 58 and the oblique correction information portion 60) and correction volume data for correcting the image information read-out address is calculated in accordance with the position accuracy information. At the same time, the correction volume data is transmitted to the address conversion portion 54. Further, in the address conversion portion 54, the above described correction volume data is used as a basis for converting the address assignment which is conducted by the address assignment portion so that correction of the image information read-out address assignment is carried out. Then, in accordance with the corrected image information read-out address, image information is read out from the image memory 48. These controlling operations as described above are effected by the read-out portion 46.

Accordingly, in order to proceed storage of the data as well as controlling as described above, the read-out portion 46 has, in addition to a CPU which serves as a core of the engine controller 56, an address counter which constitutes the address assignment portion 52, an address conversion buffer which constitutes the address conversion portion 54 and a memory device such as SRAM which constitutes the oblique correction information storage portion 60 installed in the engine controller 56.

As described above, the position accuracy information is composed of curvature correction information which is obtained from the position curvature information of the main scan direction of the image transfer unit 20, and oblique correction information which is obtained from the oblique information of the image transfer unit 20. Detection of these information and a method of storing these information into the oblique correction information storage portion 60 and the curvature correction information storage portion 58 will be proceeded as set forth below.

Figure 4:
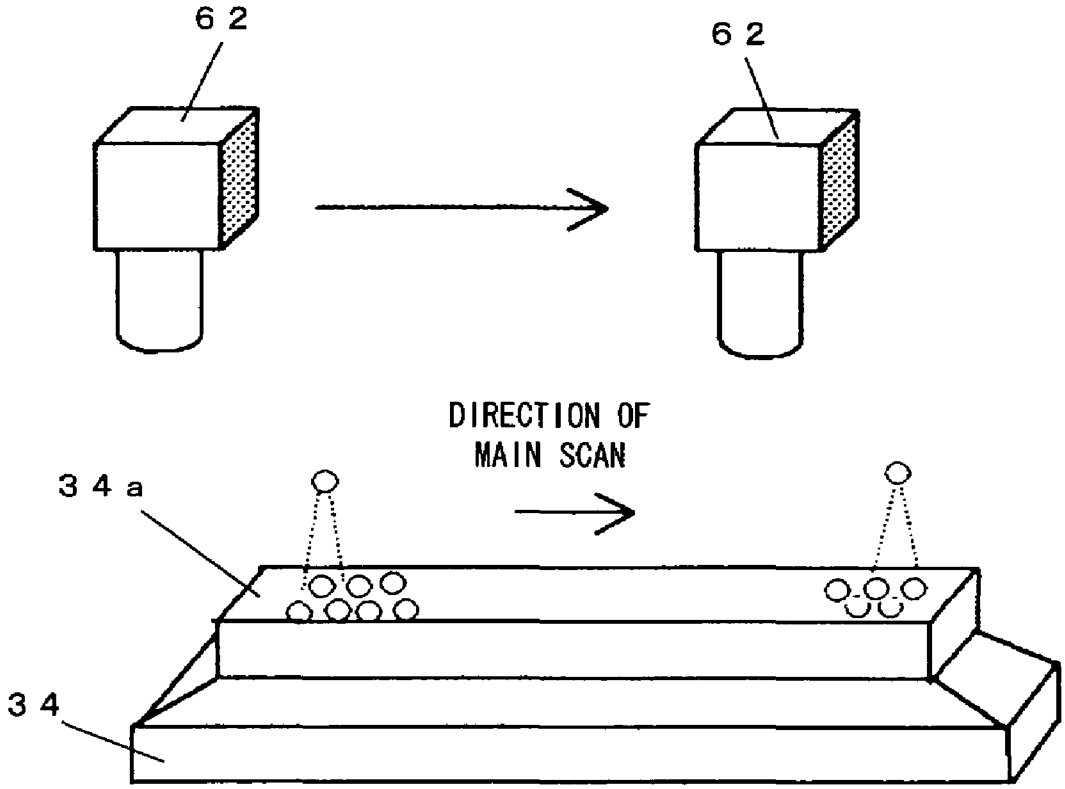
FIG. 4 is an explanatory view showing a measurement method of a curvature condition in the main scanning direction of an LED head.
Figure 5:
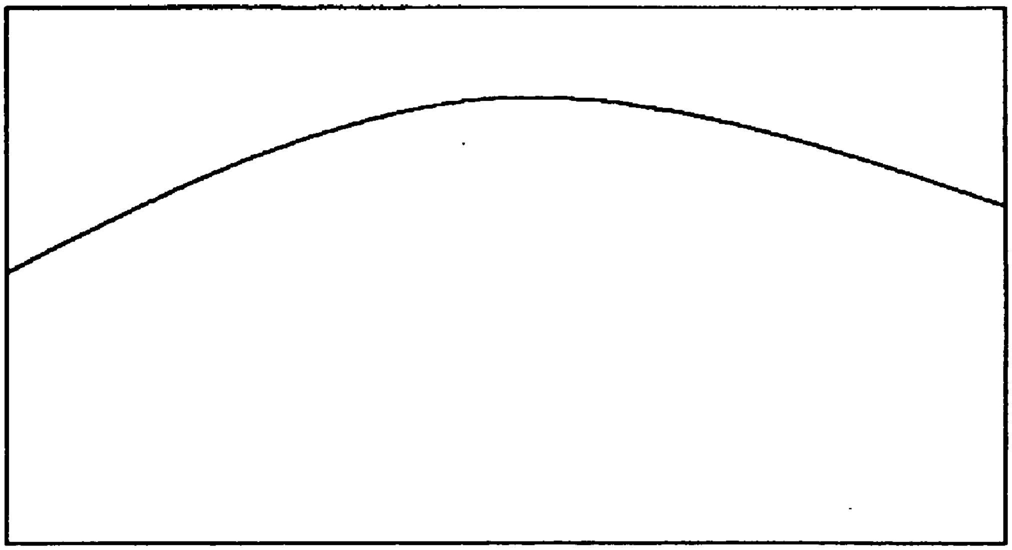
FIG. 5 is a diagram showing a measurement result of the curvature condition in the main scanning direction of the LED head.
Figure 6:
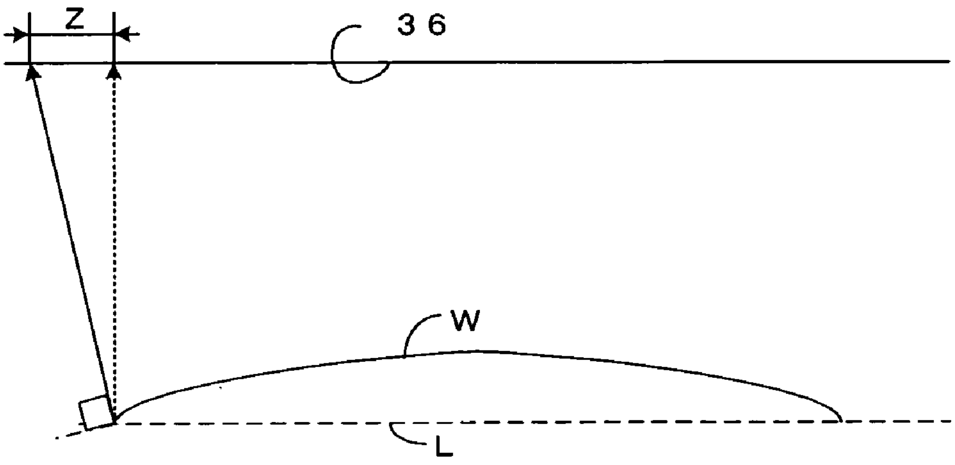
FIG. 6 is a diagram showing a misregistration generated in a case that a curvature is generated in an LED emission portion of the LED head.
Figure 7:
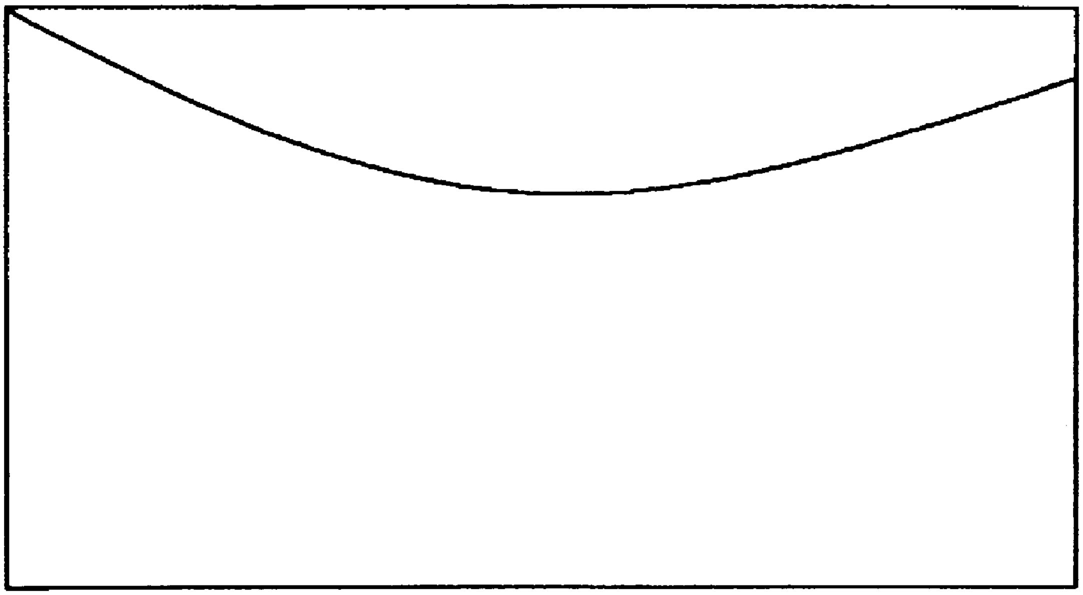
FIG. 7 is a diagram showing a correction profile of a curvature correction.
Figure 8:
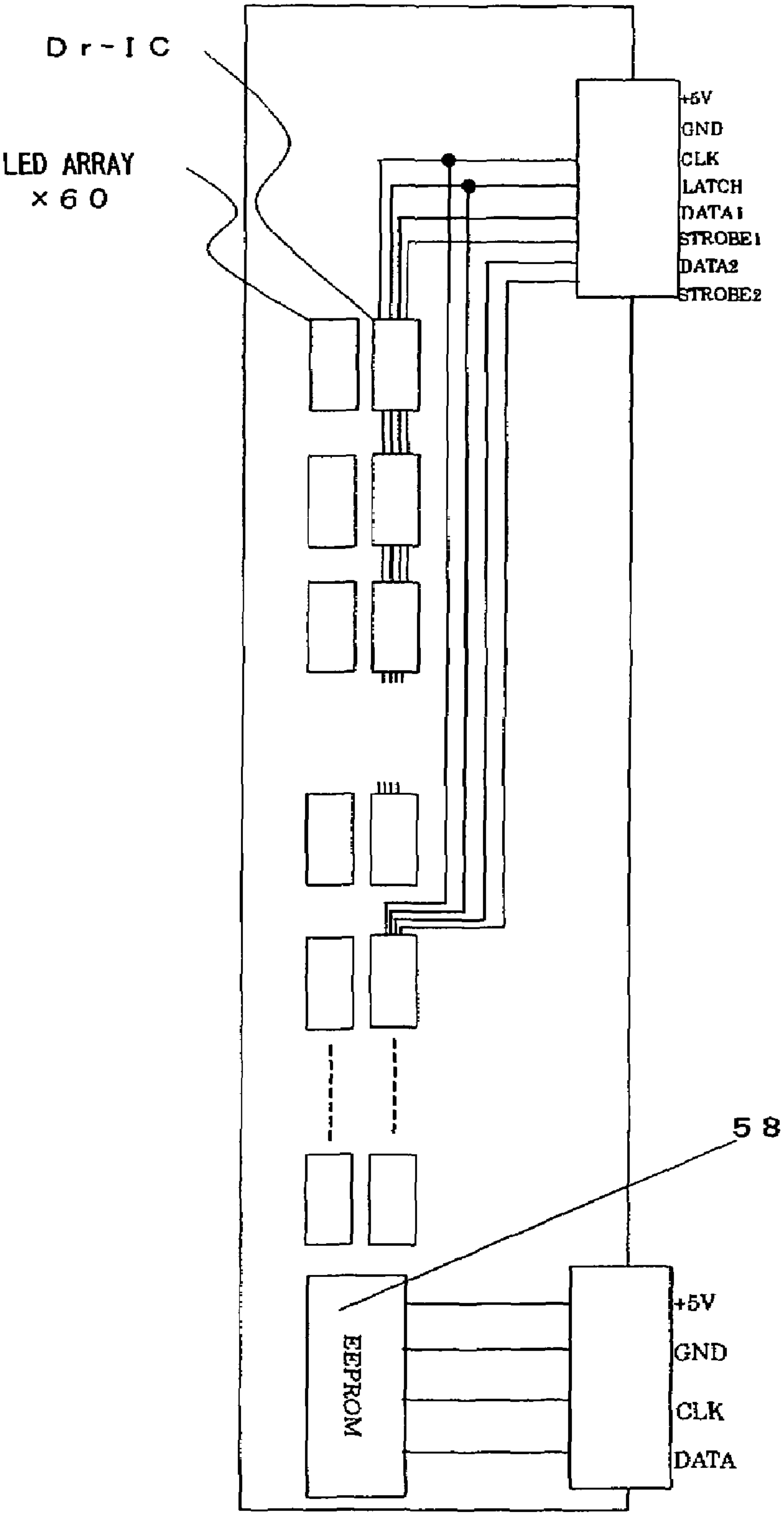
FIG. 8 is a explanatory diagram of a curvature correction information storage portion mounted on an interior of the LED head.

At the time of production of the LED head 34 of the image transfer unit 20, as shown in FIG. 4, a position accuracy information incorporation means 62 such as CCD camera is scanned in its longitudinal direction relative to the light-emitting portion 34*a* of the LED, and position curvature information (curvature direction accuracy) of the LED light-emitting portion 34*a* as shown in FIG. 5 is detected from the result of the incorporation by the position accuracy incorporation means 62. As illustrated in FIG. 6, if there is a curvature or waved portion W relative to an ideal line L of the LED light emitting portion 34*a*, there appears a shear or gap Z in an image transfer on a photosensitive drum 36 when the image transfer is proceeded from the LED head 34. Consequently, a color misregistration (shear in color) is generated. Accordingly, when position curvature information is obtained, related information as to the curvature correction degree as shown in FIG. 7, that is, a correction profile (curvature correction information) is stored in a curvature correction information storage portion 58 such as the EEPROM. The curvature correction information storage portion 58 is packaged in the LED head 34 of the image transfer unit 20. (Alternatively, it can be packaged directly in a controlling substrate of the printer body.) In FIG. 8 which shows a state that a curvature correction information storage portion 58 composed of EEPROM is packaged in the LED head 34, a transmission line for transferring image information to the LED light-emitting portion 34*a* and a transmission line for reading out curvature correction information from the curvature correction information storage portion 58 are proceeded by a common bi-directional serial communication interface.

Figure 9:
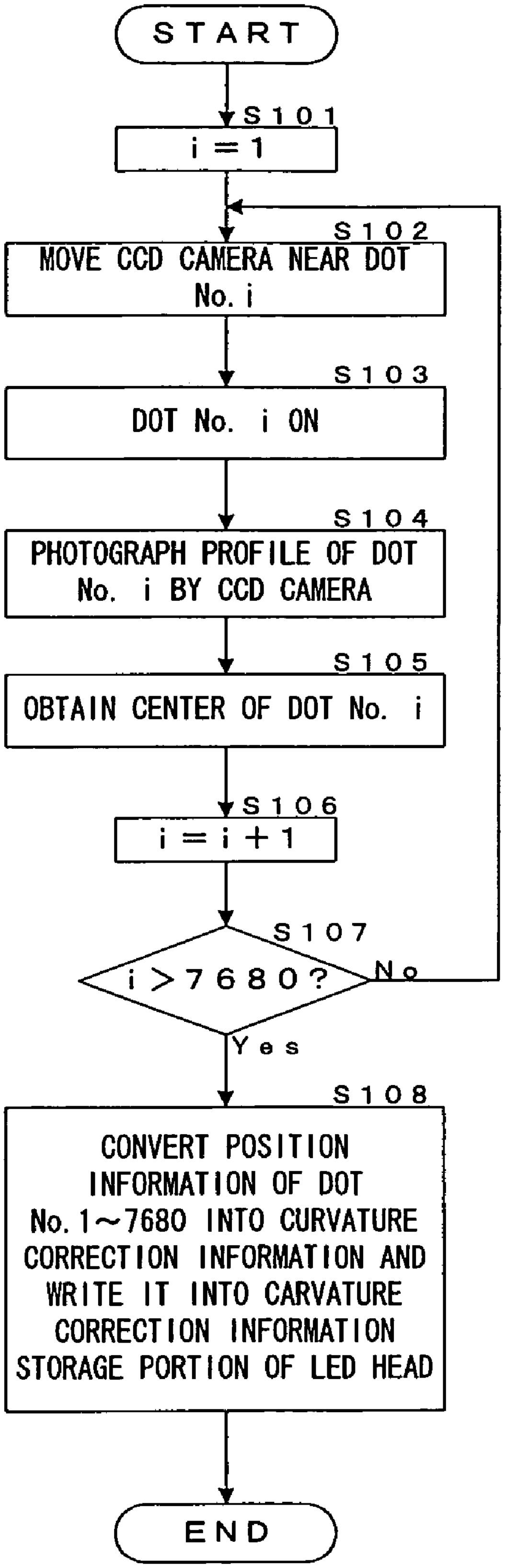
FIG. 9 is a flow diagram showing the steps for detection and storage of position curvature information.

In FIG. 9 which shows in a flow diagram a process of detection and storage of the position curvature information as described above, dot No. i of the LED light-emitting portion incorporated by a position accuracy information incorporation means 62 is set to default value 1 at an initial step (Step S101). Then, the position accuracy information incorporation means 62 (that is, CCD camera) is moved to a position near the dot No. i (Step S102). A profile of the dot No. i is photographed by the position accuracy information incorporation means 62 (CCD camera) at Step S104. Then, a central position of dot No. i is obtained at Step S105 and the dot No. i is incremented at Step S106. Thereafter, the value 1 is determined whether or not it is more than a value 7680 at Step S107. Here, the value 7680 is a total number of dots in the main scanning direction of the LED light-emitting portion 34*a* and, therefore, if the value is not reached to this level of the value as in the step (Step S107: No), then the process returns to Step S102 and repeat the above-mentioned process. On the other hand, if the value i becomes more than 7680 (Step S107: Yes), the position of the dot No. 1-7680 (that is, position curvature information) is corrected to corresponding curvature correction information and write in the information into the curvature correction information storage portion 58 at Step S108. In a case that a curvature correction is a sole procedure to be done, the aforementioned process is conducted with reference to an image transfer unit 20K as well as the other image transfer units 20A, 20M and 20Y. However, in a case that both the curvature correction and the oblique correction are conducted simultaneously as in this construction, it will be unnecessary to proceed the same with respect to the image transfer unit 20K. This is why a relative color misregistration of the other colors by a yardstick of black is obtained as oblique information in case of an oblique correction. However, with respect to the image transfer unit 20K, the above-described non-requirement of the image transfer unit 20K is not always adaptable if it is possible that its curvature correction information is at first obtained and the curvature correction information of the image transfer unit 20K is reflected to the oblique correction information of the other image transfer units 20C, 20M, 20Y.

The procedure described above is conducted in the step of production of the printer. On the basis of obtaining the oblique correction information and computation of the oblique correction information as well as the curvature correction information, the read-out address correction at the time of reading out the image information from the image storage portion 44 is conducted at the time of printing by the printer.

In other words, the printer is in the condition of ON, the curvature correction information (which has been converted into the curvature correction profile already) stored in the curvature correction information storage portion 58 in the LED head 34 is read out and then stored in the oblique correction information storage portion 60 composed by SRAM of the engine controller 56. In the oblique correction information storage portion 60, a profile of the curvature correction is stored per pixel in the subsidiary scanning direction.

Figure 11:
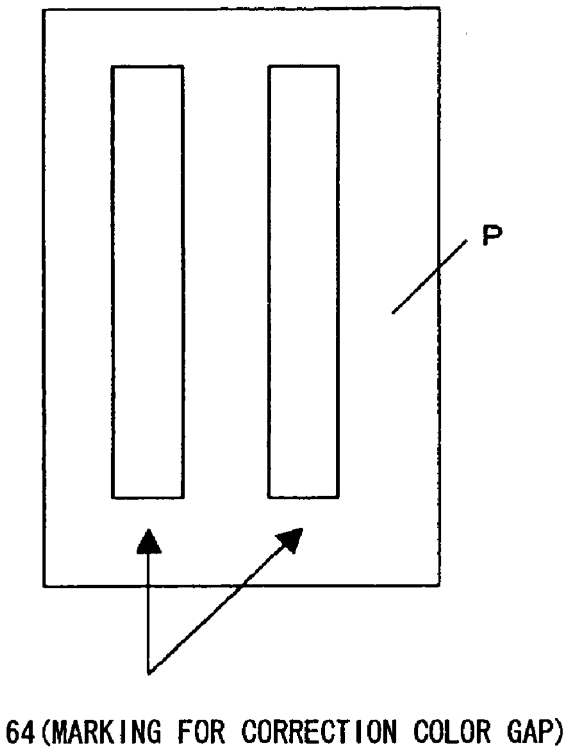
FIG. 11 is a diagram showing a method of detecting a degree of color misregistration by transferring a color misregistration correction marking on a delivery belt.
Figure 12:
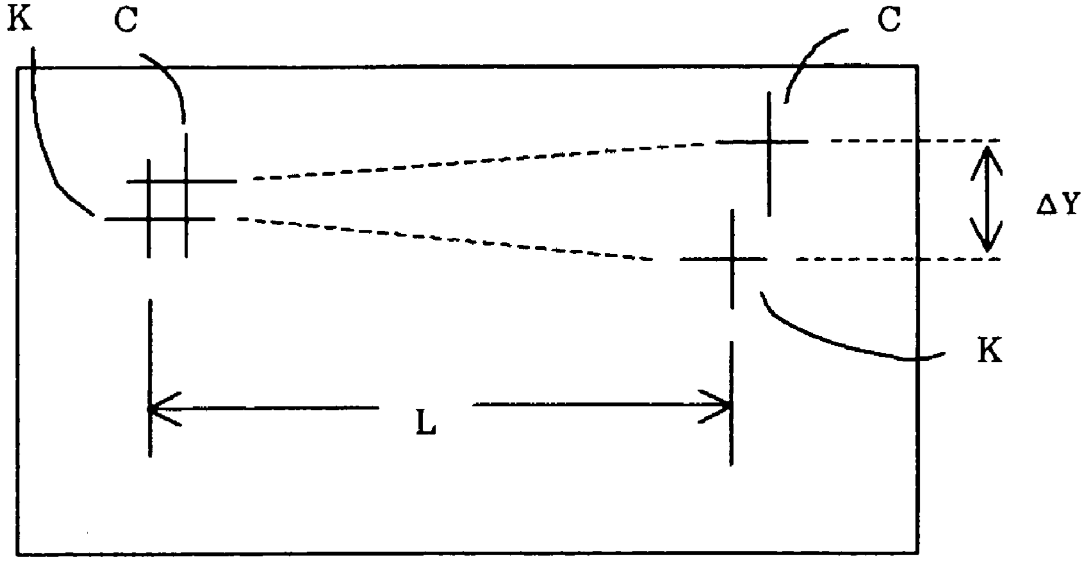
FIG. 12 is an diagram showing a detection sequence of color misregistration.
Figure 13:
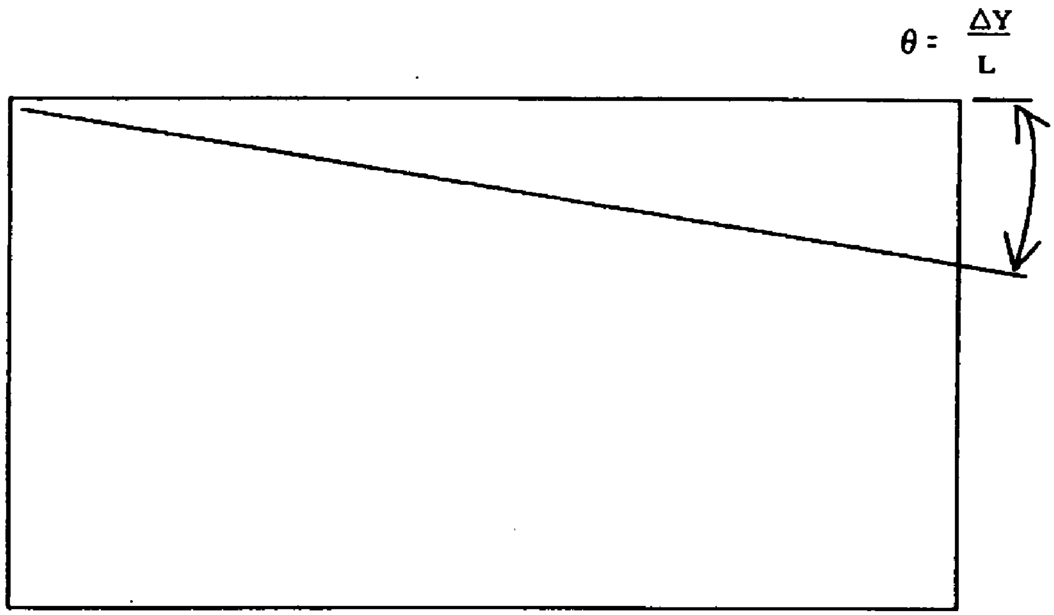
FIG. 13 is a diagram showing a correction profile of an oblique correction.

As shown in FIG. 11, on the delivery belt 22 of the engine portion 38, a color misregistration (i.e., discrepancy) correction mark 64 is transferred to thereby detect a degree of the color misregistration. A color misregistration detection sequence will be explained with reference to FIG. 12, in which when black K and cyanogen C are transferred in an overlapping relation, there are transfer gap or misregistration in the right-hand side sub-scanning direction and the left-hand side sub-scanning direction as shown in FIG. 12, and its difference represented by $\Delta Y$ is a color misregistration degree and, on the basis of this color misregistration degree, a correction profile ($\theta=\Delta Y/L$) of the oblique correction as shown in FIG. 13 is produced. As shown in FIG. 19, this profile is also stored in the oblique correction information storage portion 60 per pixel. These processes will be conducted as well with reference to image transfer unit 20M and 20Y of magenta M and yellow Y, respectively.

Figure 14:
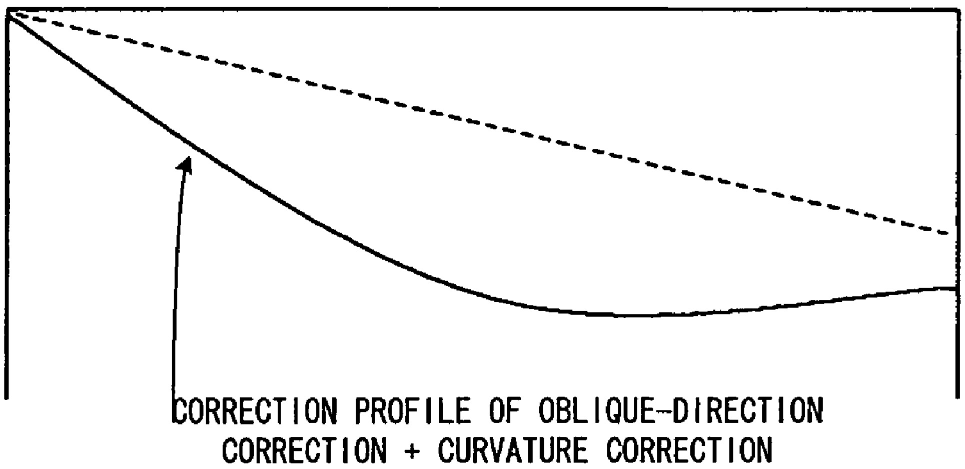
FIG. 14 is an imaginary illustration of a correction profile which is synthesized by a profile of the oblique correction and a profile of the curvature correction.

The engine controller 56 adds the both profiles shown in FIG. 10 and then stored in the oblique correction information storage portion 60 as a correction value of an address assignment which is represented in the right-hand side column of FIG. 10. FIG. 14 is a diagram showing an imaginary view of a correction profile which is synthesized by a correction profile of the oblique correction and a correction profile of the curvature correction.

Figure 15:
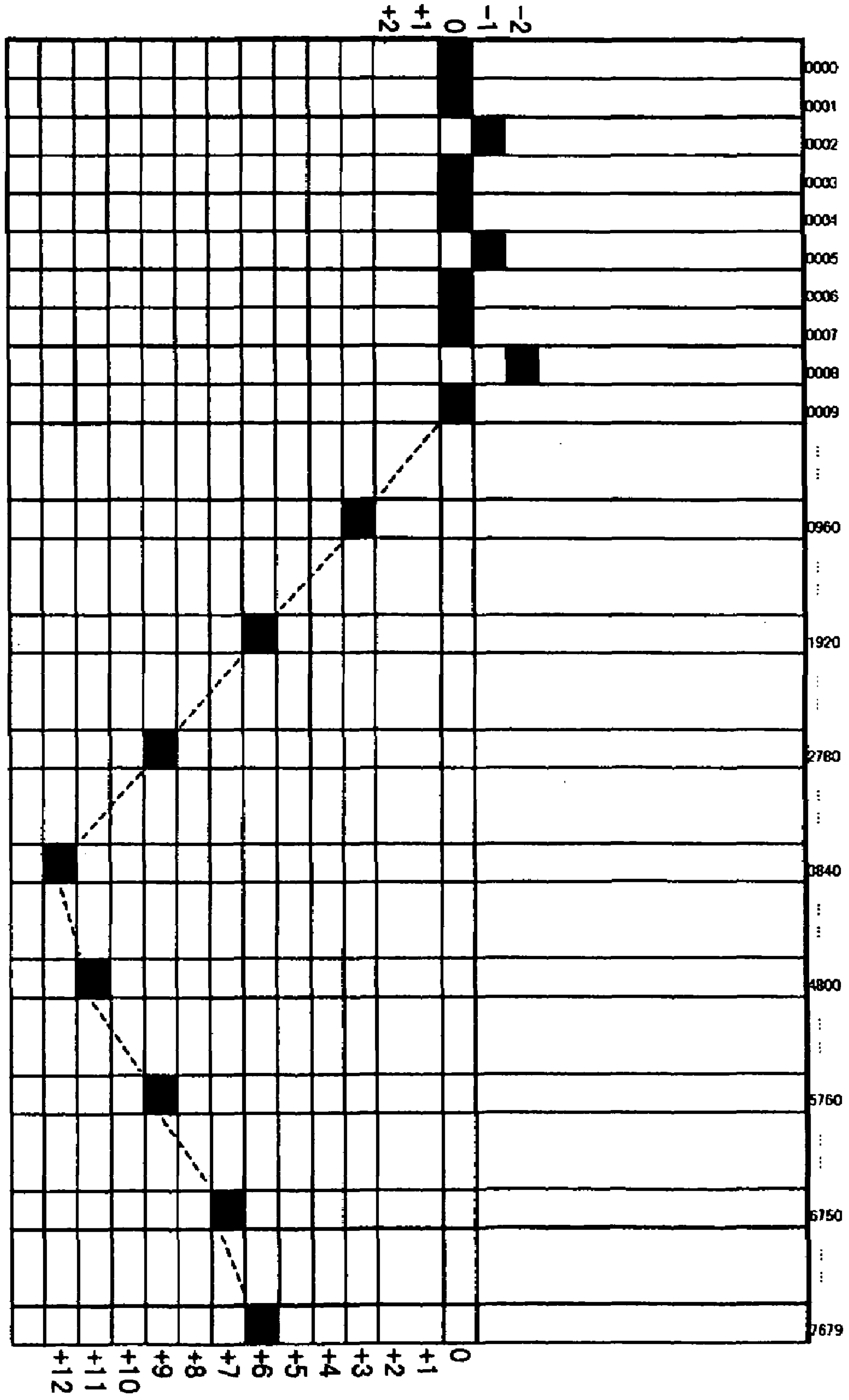
FIG. 15 is an illustration showing a correction state of an address assignment in an address converting portion.

When printing data is transmitted from a host, it is developed in turn into image memory 48 (screen buffer) of 7689 dots (X direction; main scanning direction)×48 dots (Y direction: sub-scanning direction) by means of the image development portion 42. Then, by the read-out portion 46, image data divided by line is transmitted to the line buffer side 50 from the image memory 48. At this moment, the engine controller 56 proceeds correction of address assignment for addressing, according to the correction profile of the right-hand side of FIG. 10, the address which has been designated by the address assignment portion 52 in the address conversion potion 54, so that the assigned (or designated) address is addressed for curvature plus oblique correction value. FIG. 15 shows a correction (conversion) state of the address assignment in the address conversion portion 54. On the basis of this corrected address, the divided image data is transmitted from the image memory 48 to the line buffer 50, and the divided image data for each line is transmitted to the LED light-emitting portion 34*a* of the LED head 34 by the line buffer 50. In the last step, the image is exposed on the photosensitive drum 36 by the LED light-emitting portion 34*a* in accordance with the divided image data. The processes as described above are carried out for each of the image transfer units 20C, 20M and 20Y for cyanogen C, magenta M and yellow Y, respectively.

Figure 16:
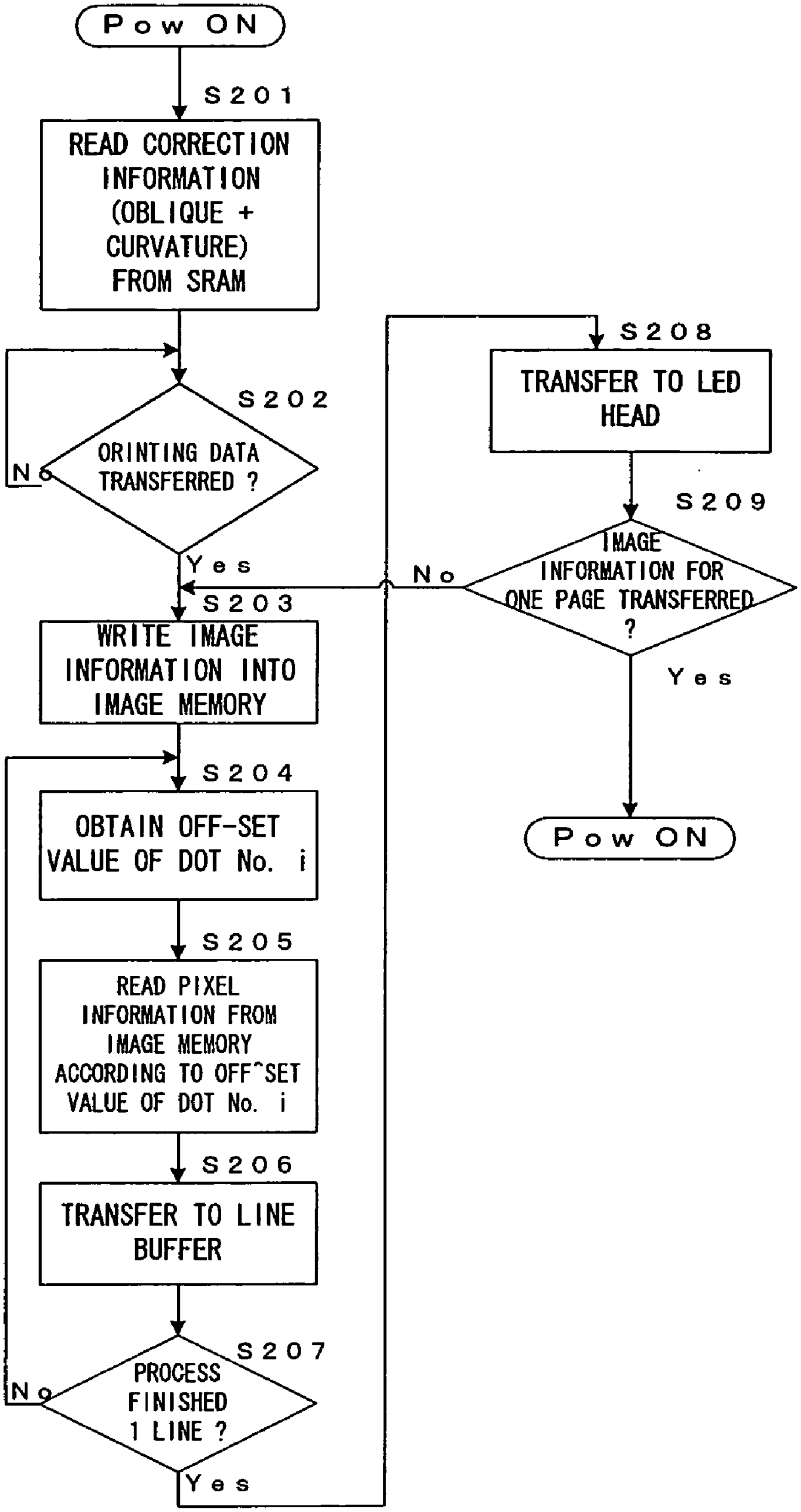
FIG. 16 is a flow diagram showing the steps of a position correction at the time of printing.

In FIG. 16 which is a flow diagram showing a process or steps for position correction at the time of printing, printing correction information that is, curvature and oblique correction, is read out from the oblique correction information storage portion 60 which is composed of SRAM (Step S201). Then, the printing data is checked until the printing data is obtained. After the printing data reaches (Step S202; Yes), developed image information is written in the image memory 48 (Step S203). The engine controller 56 seeks an offset value of dot No. i and proceeds correction of address assignment (correction addressing) for the offset value in the address conversion portion 54 (Step S204). According to the offset value of dot No. i, image information is read out from the image memory 48 (Step S205) and transmitted to the line buffer 50 (Step S206). Then, a checking is made to see whether the above-mentioned processes are all finished for one line (that is, for 7680 dots) in Step S207. If the process is not finished for one line (Step S207: No), the process goes back to Step S204 to repeat the above-described procedure. If, on the other hand, the process is finished for one line, (Step S207: Yes), image data for one line is transmitted from the line buffer 50 to the LED head 34 (Step S208). By the process described above, checking is made to see whether or not the transmission of image data for one page has finished (Step S209). If the transmission for one page is not yet finished (Step S209: No), the process goes back to Step S203 and repeat the aforementioned processes. If, on the other hand, the transmission of one page is finished (Step S209: Yes), a printing procedure which has completed the position correction according to the present invention will be determined to be finished.

(Second Embodiment of the Invention)

A second embodiment of the present invention will be described. In this embodiment, a basic structure of the apparatus is substantially similar as that of the first embodiment. However, in the second embodiment, the position curvature information of the image transfer unit is not previously detected at the step of production as in the first embodiment, but the position curvature information of each of the LED heads 34 is collected, after the production step, at the stage of the use of this printer by the users in this embodiment, and the curvature correction information is stored in the curvature correction information storage portion 58 which is packaged in each of the LED heads 34.

In other words, the LED head 34 of the image transfer unit 20 includes therein a curvature correction information storage portion 58 which is consisted with EEPROM for storing each of the curvature correction information, and the information is not stored in the stage of production. Thereafter, user and/or repairing personnel seek the position curvature information (i.e., curvature degree) from the printing results so that the curvature correction information for the purpose of correcting the above-described information is stored or written in the curvature correction information storage portion 58. The detection of this position curvature information is made possible by, for example, superposing the black K and the cyanogen C on the same position in a registered relation and then transferring the same onto a paper P, and detection is made to find difference of brightness from the transferred image such as superposed lines and so forth, so that the position curvature information can be detected by, for example, Fourier Transform. Similarly, the same procedure can be made with reference to the combination between black K and magenta M and a combination between black K and yellow Y.

At this moment, since the curvature correction information storage portion 58 is incorporated in the LED head 34, it is not possible to directly connect additional structure for writing in the above-described curvature correction information to the above-described curvature correction information storage portion 58. As described above, the engine controller 56 in the read-out portion 46 is connected with the address conversion portion 54 and the address assignment portion 52 for proceeding the address assignment of the image memory 48 at the time of transmitting image information to the LED head 34 and, therefore, it will be satisfactory that a connection with the curvature correction information storage portion 58 is made by way of a transmission line which has a bi-directional serial communication interface which transmits image information to the LED head 34. In other words, the curvature correction information is written in or stored in the curvature correction information storage portion 58 of the LED head portion 34 by the use of the above-described transmission line, from the engine controller 56. By this procedure, it is not necessary to provide additional interface device which serves to store the curvature correction information and, therefore, reduction can be obtained in production costs as well as production steps, production parts and elements. Incidentally, if the curvature correction information storage portion 58 is composed of EEPROM, it will be necessary to provide a structure which can supply a predetermined electric voltage to the LED head side 34 for the purpose of writing-in the above-described information, as shown in FIG. 8.

A write-in operation of the curvature correction information based upon the above-described position curvature information will be described. In the first step, a color of black K and any other color(s) are placed in a superposed relation and printed on a paper P. By the printing results, a positional gap or, in other words, misregistration or position (that is, position curvature information) is obtained by the method described above. Misregistration of color as well is obtained in the same manner. From these positional gap (that is, position curvature information), a position correction amount (curvature correction amount) is obtained by calculation. The above-described position correction amount is embedded into, for the purpose of transmission, a position information transmission command of the LED light-emitting portion, which command is set in a command setting between the host and the controller portion 40. The position correction information is fed to the host-controller portion 40 and the engine controller 56 and then stored in the curvature correction information storage portion 58 of the LED head 34 by the engine controller 56.

As described above, the curvature correction information of the image transfer unit 20 can be previously stored in the curvature correction information storage portion 58 and, in addition, curvature correction information which corresponds to the position curvature information in the scanning direction of the image transfer unit. For this purpose, the aforementioned read-out portion 46 reads out curvature correction information from the curvature correction information storage portion 58 and, according to this information, a correction for the image information read-out address assignment is conducted and the image information is read out from the image memory 48 in accordance with the corrected image information read-out address, so that its correction is available even if there is a deficiency that the process depends solely upon production accuracy of each element of the LED heads 34. Thus, it will be possible to avoid color misregistration or color gap in the printing results. Further, in a case that a correction is proceeded with respect to image information read-out address assignment, the correction is made not only in accordance with the above-described curvature correction information but also on the basis of computing or operating results of both the curvature correction information and the oblique correction information. Therefore, the above-described defects can be cleared out more remarkably and a predetermined, clean color image can be obtained.

In the construction of the first embodiment of the invention described above, the curvature correction information storage portion 58 which stores therein the curvature correction information is packaged into the LED head 34 of the image transfer unit 20 and, therefore, even if there is an exchange of these image transfer units 20, each of the units is provided with its own and dependent curvature correction information, so that there is no problem in the printing results such as positional gap of misregistration or color gap.

On the other hand, as described with reference to the second embodiment of the invention, it will be possible that a correction amount is obtained from the printing results and the above-described curvature correction information is written in posteriori. In that case. If the correction amount is calculated on the basis of an optional color among the four colors, the position correction amount of the image transfer unit 20 for a transfer of a standard color will become zero (0), and a step or steps for writing in the data into the curvature correction information storage portion 58 can be omitted. In addition, since the connection between the engine controller 56 and the curvature correction information storage portion 58 is conducted by way of the transmission line which has a bi-directional serial communication interface for transmitting or setting-up the image information to the LED head side 34, the curvature correction information can be written in the curvature correction information storage portion 58 of the LED head 34 by the use of the above-described transmission line from the engine controller 56. By this, any additional interface device for separately and independently storing the curvature correction information is not required and, therefore, reduction of production cost can be attained as well as production steps and production parts and elements.

Although the present invention has been described with reference to the preferred embodiments only, it should be appreciated that many modifications and alterations can be made within the scope of the appended claims.

The effects and advantages of the image formation apparatus according to the present invention will be described.

In the image information apparatus in one aspect of the invention (as defined in claims 1 through 12), position accuracy information in the scanning direction of the image transfer unit can be stored previously or position accuracy information in the scanning direction of the image transfer unit which was detected before the image transferring can be stored. Therefore, at the time of image transfer step, the read-out means can read out the position accuracy information from the accuracy information storage means and, in accordance with the position accuracy information, the image information read-out position is corrected and the image information is read out from the image storage means in accordance with the corrected image information read-out position. This will permit the correction procedure even if there is a deficiency that the image transfer depends solely upon production accuracy of each image transfer unit. Thus, the present invention can provide advantages that no color gap and/or positional misregistration of transferred image is generated.

In the construction of the image formation apparatus of another feature of the invention (as defined in claims 4 and 8), the position accuracy information is stored in the accuracy information storage means for each image transfer unit. In a further feature of the invention (as defined in claims 5 and 9), correction of the image information read-out position by the read-out means is conducted for each image transfer unit. In these features, the problems of color gap or misregistration caused by curvature and dot-pitch deficiency of the exposure portion which depends upon the production accuracy of each image transfer unit can be effectively solved. In the feature of the invention (which is defined in claim 9), when the image read-out position is corrected, an operation or computation is executed on the basis of the curvature correction information and/or dot-pitch correction information and the oblique correction and, therefore, the above-mentioned problems and disadvantages can be solved to a remarkable extent, so that a clearer color image can be obtained.

In another feature of the invention (as defined in claims 6 and 10), the accuracy information storage means for the position accuracy information is packaged or installed in the image transfer unit. This permit an effective cancellation of color and positional gaps of image transfer because each of the units has its own information, even if the image transfer unit is changed. The same is true of the other features of the invention (which are defined in claim 13.

In another feature of the invention (as defined in claims 11 and 12), curvature correction information and/or dot-pitch correction information among the aforementioned position accuracy information is (are) transmitted to the read-out means and stored in the accuracy information storage means. This does not require additional provision of an interface device for the purpose of transmission only and, therefore, reduction of production cost as well as decrease in production parts and elements and production steps can be attained.

What is claimed is:

1. An image formation apparatus comprising:

an image storage means for storing image information;

a read-out means for assigning an image information read-out position of the image storage means to read out the image information;

an image transfer unit for transferring an image onto a paper in accordance with the image information read out by the read-out means from the image storage means; and an accuracy information storage means for storing unit curvature correction information and/or dot-pitch correction information, wherein said curvature correction information is obtained based on the measurement result of the position curvature information in the scanning direction of an exposure portion of the image transfer unit, and said dot-pitch correction information is obtained by measuring the dot-pitch of the exposure portion;

wherein the read-out means has a means for reading out the position accuracy information from the accuracy information storage means and correcting the image information read-out position by the position accuracy information.

2. An image formation apparatus according to claim 1, wherein the curvature correction information and/or dot-pitch correction information is stored in the accuracy information storage means per image transfer unit.

3. An image formation apparatus according to claim 1, wherein correction of the image information read-out position by the read-out means is conducted per image transfer unit.

4. An image formation apparatus according to claim 1, wherein the accuracy information storage means is installed in the image transfer unit.

5. An image formation apparatus according to claim 1, wherein correction of the image information read-out position by the read-out means is conducted per image transfer unit through an operation based upon the curvature correction information and/or the dot-pitch correction information and the oblique correction information.

6. An image formation apparatus according to claim 1, wherein the accuracy information storage means is installed in the image transfer unit, whereby the image transfer unit may be replaced by another image transfer unit.

7. An image formation apparatus to claim 6, wherein at least one of the curvature correction information and the dot-pitch correction information is transmitted by a transmission line used for reading out the image information from the image storage means, and is read out by the read-out means.

8. An image formation apparatus according to claim 6, wherein at least one of the curvature correction information and the dot-pitch correction information is transmitted by a transmission line used for reading out the image information from the image storage means, and is stored in the accuracy information storage means.

9. An image transfer unit, wherein curvature correction information and/or dot-pitch correction information is stored in an accuracy information storage means of an exposure portion of the image transfer unit, and wherein said curvature correction information is obtained based on the measurement result of the position curvature information in the scanning direction of the exposure portion, and said dot-pitch correction information is obtained by measuring the dot-pitch of the exposure portion.

* * * * *